United States Patent
Suh et al.

(10) Patent No.: US 8,988,511 B2
(45) Date of Patent: Mar. 24, 2015

(54) PHOTOGRAPHABLE THREE-DIMENSIONAL (3D) DISPLAY APPARATUS

(75) Inventors: Sung Joo Suh, Seoul (KR); Chang Kyu Choi, Seongnam-si (KR); Kwon Ju Yi, Yongin-si (KR); Du Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 382 days.

(21) Appl. No.: 13/064,570

(22) Filed: Mar. 31, 2011

(65) Prior Publication Data

US 2012/0026160 A1 Feb. 2, 2012

(30) Foreign Application Priority Data

Aug. 2, 2010 (KR) .................. 10-2010-0074713

(51) Int. Cl.
*H04N 13/04* (2006.01)
*G06T 15/00* (2011.01)
*H04N 13/02* (2006.01)

(52) U.S. Cl.
CPC ....... *H04N 13/0413* (2013.01); *H04N 13/0217* (2013.01)
USPC ........................................... 348/51; 345/419

(58) Field of Classification Search
None
See application file for complete search history.

(56) References Cited

U.S. PATENT DOCUMENTS

| | | | | |
|---|---|---|---|---|
| 5,315,377 | A * | 5/1994 | Isono et al. | 348/51 |
| 5,705,413 | A * | 1/1998 | Harkin et al. | 438/155 |
| 2006/0126177 | A1* | 6/2006 | Kim et al. | 359/465 |
| 2006/0157640 | A1* | 7/2006 | Perlman et al. | 250/208.1 |
| 2009/0002341 | A1* | 1/2009 | Saito et al. | 345/175 |
| 2009/0091815 | A1* | 4/2009 | Shiu et al. | 359/245 |
| 2010/0238274 | A1* | 9/2010 | Kim et al. | 348/51 |
| 2010/0328438 | A1* | 12/2010 | Ohyama et al. | 348/51 |
| 2011/0019056 | A1* | 1/2011 | Hirsch et al. | 348/333.01 |
| 2011/0148859 | A1* | 6/2011 | Huang et al. | 345/419 |

FOREIGN PATENT DOCUMENTS

| | | |
|---|---|---|
| JP | 2008-134489 | 6/2008 |
| JP | 2008-257495 | 10/2008 |
| JP | 2009-020294 | 1/2009 |
| JP | 2009-294315 | 12/2009 |
| JP | 2010-055508 | 3/2010 |
| JP | 2010-108303 | 5/2010 |
| KR | 10-2009-0067043 | 6/2009 |

OTHER PUBLICATIONS

"BiDi Screen: A Thin, Depth-Sensing LCD for 3D Interaction using Light Fields", Matthew Hirsch et al., Proceeding of SIGGRAP ASIA, Dec. 2009.

(Continued)

*Primary Examiner* — Joseph Ustaris
*Assistant Examiner* — Zhubing Ren
(74) *Attorney, Agent, or Firm* — NSIP Law

(57) ABSTRACT

Provided is a three-dimensional (3D) display apparatus. The 3D display apparatus may include a mode decision unit to determine a mode corresponding to a predetermined criterion, a barrier panel to form a pattern based on the determined mode, and a controller to control a power of a backlight unit associated with an image panel, based on the determined mode.

19 Claims, 9 Drawing Sheets

(56) References Cited

OTHER PUBLICATIONS

"Parameters for designing autostereoscopic imaging systems based on lenticular, parallax barrier, and integral photography plates", Jung-Young Son et al., Optical Engineering, vol. 42, Nov. 2003, pp. 3326-3333.

"A Continuous-Grain Silicon-System LCD with Optical Input Function", Chris J. Brown et al., IEEE Journal of Solid-State Circuits, vol. 42, No. 12, Dec. 2007, pp. 2904-2912.

* cited by examiner (i)  (ii)  (iii)

(i)  (ii)  (iii)

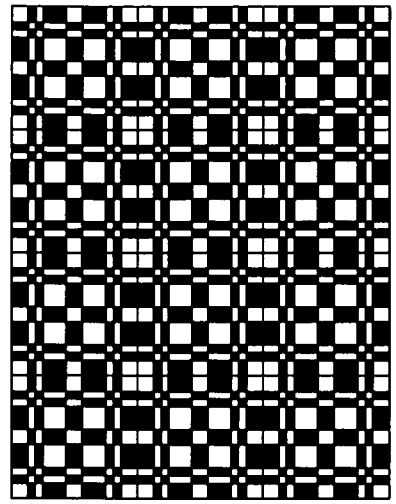
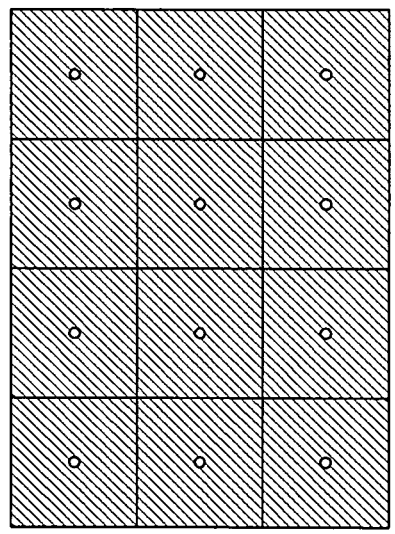
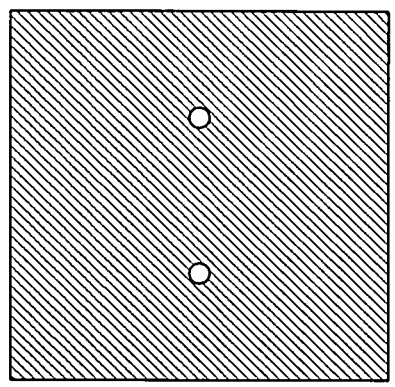
FIG. 5

FIG. 8
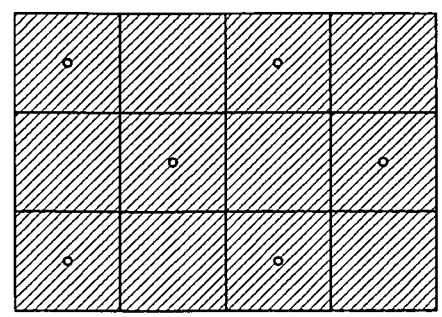
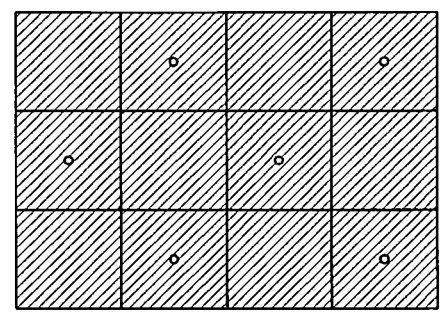

PHOTOGRAPHABLE THREE-DIMENSIONAL (3D) DISPLAY APPARATUS

CROSS-REFERENCE TO RELATED APPLICATIONS

This application claims the priority benefit of Korean Patent Application No. 10-2010-0074713, filed on Aug. 2, 2010, in the Korean Intellectual Property Office, the disclosure of which is incorporated herein by reference.

BACKGROUND

1. Field

Example embodiments relate to a three-dimensional (3D) display apparatus that may display a 3D image and take a photograph by sensing light reflected from an object.

2. Description of the Related Art

With development of a three-dimensional (3D) image, a 3D display apparatus supporting the 3D image has been developed.

As the 3D display apparatus is applied to various types of fields, for example, video call and the like, a display mode for displaying an image and a photographing mode for acquiring image data may be used.

Accordingly, there is a desire for a 3D display apparatus that may effectively perform a switching operation between a display mode and a photographing mode.

SUMMARY

The foregoing and/or other aspects are achieved by providing a three-dimensional (3D) display apparatus, including a mode decision unit to determine a mode corresponding to a predetermined criterion, a barrier panel to form a pattern based on the determined mode, and a controller to control a power of a backlight unit associated with an image panel, based on the determined mode.

When a display mode is set by the mode decision unit, the barrier panel may form a barrier pattern for three-dimensionally visualizing an image displayed on the image panel. The controller may control the backlight unit to be powered on.

When a photographing mode is set by the mode decision unit, the barrier panel may form a photographing pattern for passing light emitted from an object. The controller may control the backlight unit to be powered off.

The example embodiments may include a 3D display apparatus that may provide a 3D image by enabling a left image and a right image provided to an image panel to be separately recognized through a barrier pattern of a barrier panel. By sensing light having been reflected from an object and having passed through a photographing pattern of the barrier panel, the 3D display apparatus may readily photograph an image of the object.

When the 3D display apparatus is applied to a terminal supporting a 3D video call, the 3D display apparatus may alternately support a photographing mode and a display mode to position both a configuration of displaying an image and a configuration of photographing the image. Accordingly, a user may match the user's viewpoint with a viewpoint of a counter party while making the 3D video call.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 5 illustrates a pattern of a barrier panel included in a 3D display apparatus according to other example embodiments; and FIG. 6 through FIG. 8 illustrate a pattern of a barrier panel included in a 3D display apparatus according to still other example embodiments.

DETAILED DESCRIPTION

Figure 1:
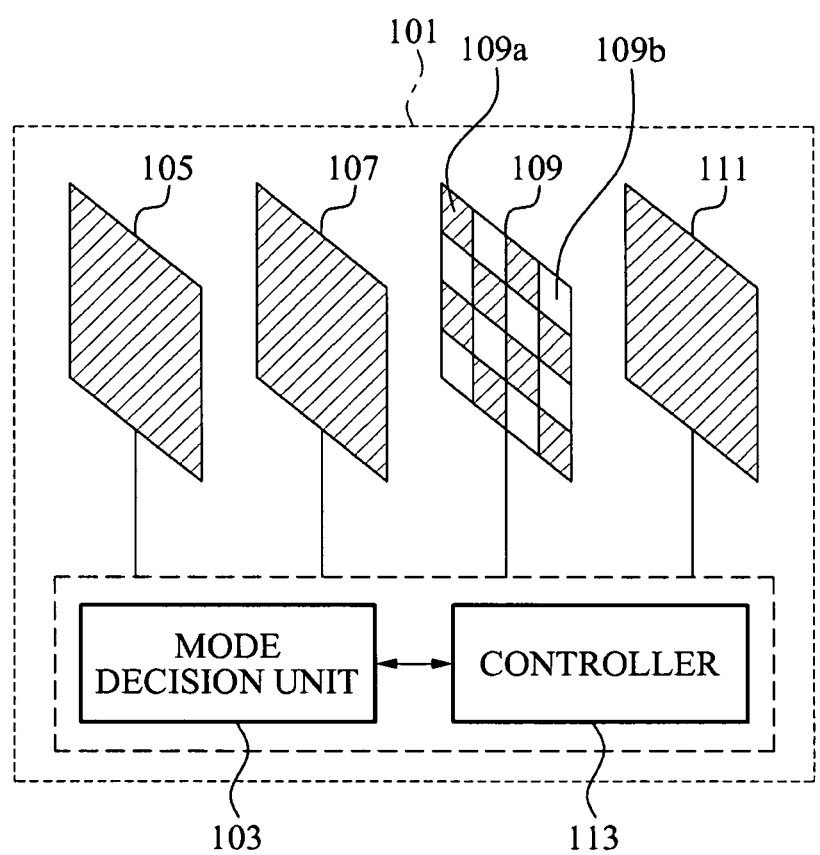
FIG. 1 illustrates a three-dimensional (3D) display apparatus according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an example of a three-dimensional (3D) display apparatus 101 according to example embodiments.

Referring to FIG. 1, the 3D display apparatus 101 may include a mode decision unit 103, a barrier panel 105, an image panel 107, an optical sensor panel 109, a backlight unit 111, and a controller 113.

The mode decision unit 103 may determine a mode corresponding to a predetermined criterion, for example, a display mode or a photographing mode. The mode decision unit 103 may set, as the criterion, at least one of an occurrence of a mode switch command, and a mode switch period. For example, when the 3D display apparatus 101 operates in a total frequency range of 240 Hz, the mode decision unit 103 may operate while alternately switching between the display mode for 120 Hz and the photographing mode for another 120 Hz.

The barrier panel 105 may form a pattern based on a mode determined by the mode decision unit 103. For example, when the display mode is set by the mode decision unit 103, the barrier panel 105 may form a barrier pattern for three-dimensionally visualizing an image displayed on the image panel 107 and enables a different image to be recognized based on a parallax of a left eye and a right eye. The barrier panel 105 may form, for example, a stripe pattern as the barrier pattern.

When the photographing mode is set by the mode decision unit 103, the barrier panel 105 may form a photographing pattern for passing the first light or object light emitted or reflected from an object. The barrier panel 105 may include an opaque first pixel and a transparent second pixel. The barrier panel 105 may form, as the photographing pattern, at least one pattern of a circular hole, a polygonal hole, and a modified uniformly redundant array (MURA) by combining the first pixel and the second pixel. The barrier panel 105 may pass the first light emitted from the object, through an optical meaning of hole capable of passing light instead of blocking the light.

The barrier panel 105 may form a variety of patterns by changing at least one of a number of opaque first pixels, a number of transparent second pixels, a position of each opaque first pixel, and a position of each transparent second pixel. The barrier panel 105 may form a plurality of patterns, and may also change a number of patterns or a position of each pattern at predetermined intervals. For example, the barrier panel 105 may horizontally or vertically form the plurality of patterns.

Although not illustrated, the barrier panel 105 may include a contact sensor panel enabling touch sensing with the object. The barrier panel 105 may include a sensor unit enabling touch sensing together with red (R), green (G), and blue (B) sub-pixels within each pixel.

The image panel 107 may be, for example, a liquid crystal display (LCD) panel or an organic light emitting diode (OLED) panel, and be disposed below the barrier panel 105. When the display mode is set by the mode decision unit 103, the image panel 107 may display an image using a second light or backlight from the backlight unit 111. The image panel 107 may display a 3D image including a left image and a right image. When the photographing mode is set by the mode decision unit 103, the image panel 107 may pass the first light having passed through the barrier panel 105 by controlling a pixel within a panel to be transparent using the controller 113 according to an aspect.

When the photographing mode is set by the mode decision unit 103, the optical sensor panel 109 may acquire image data of the object by sensing the first light emitted from the object. The optical sensor panel 109 may be included in the image panel 107 and be integrally configured with the image panel 107, or may be positioned at a rear end of the image panel 107 and be separately configured.

As one example, when the optical sensor panel 109 is included in the image panel 107 and is integrally configured, the optical sensor panel 109 may acquire image data of the object by sensing the first light having passed through the barrier panel 105. The image panel 107 may include a sensor unit to sense the first light together with RGB sub-pixels within each pixel.

As another example, when the optical sensor panel 109 is positioned at the rear end of the image panel 107 and is separately configured, the optical sensor panel 109 may acquire image data of the object by sensing the first light having passed through the barrier panel 105 and the image panel 107.

When a hole included in the photographing pattern of the barrier panel 105 is formed based on a pixel unit including R, G, and B, the optical sensor panel 109 may acquire image data corresponding to each of R, G, and B by sensing light having passed through the hole. When the hole included in the photographing pattern of the barrier panel 105 is formed based on a sub-pixel unit, a hole formed in an R sub-pixel, a hole formed in a G sub-pixel, and a hole formed in a B sub-pixel may be sequentially formed and thus, the optical sensor panel 109 may acquire image data corresponding to each of R, G, and B by sensing light having passed through each hole.

The optical sensor panel 109 may include a color filter, and may acquire image data corresponding to a color of the color filter. The optical sensor panel 109 may include a first sensor unit and a second sensor unit. Each of the first sensor unit and the second sensor unit may include a unit color filter having a different color, or each of the first sensor unit and the second sensor unit may include a plurality of color filters having different colors.

When the optical sensor unit 109 includes an R color filter, the optical sensor panel 109 may acquire image data corresponding to R by sensing light having passed through a hole included in the photographing pattern of the barrier panel 105. When the optical sensor unit 109 includes a B color filer, the optical sensor panel 109 may acquire image data corresponding to B by sensing light having passed through the hole.

When a plurality of photographing patterns is formed on the barrier panel 105, the optical sensor unit 109 may acquire image data of the object observed at different angles by sensing the first light having passed through the plurality of photographing patterns.

The optical sensor unit 109 may include a sensor unit 109a to sense the first light emitted from the object when the photographing mode is set by the mode decision unit 103, and an aperture 109b to pass the second light emitted from the backlight unit 111 towards the image panel 107 when the display panel is set by the mode decision unit 103. The aperture 109b may indicate an optical meaning of a hole capable of passing light without blocking the light, which is the same function as the hole formed in the barrier panel 105.

Even though the optical sensor panel 109 including the sensor unit 109a and the aperture 109b are positioned at the rear end of the image panel 107 without being included in the image panel 107, the optical sensor panel 109 may acquire image data of the object by sensing the first light having passed through the barrier panel 105 and the image panel 107, and may readily transfer the second light emitted from the backlight unit 111 to the image panel 107 via the aperture 109b.

By configuring the sensor unit 109a and the aperture 109b in a form of a grid pattern, or a in form of a repeating pattern, the optical sensor panel 109 may uniformly acquire the first light reflected from the object and may also uniformly transfer, to the image panel 107, the second light emitted from the backlight unit 111.

The optical sensor panel 109 may further include, in a position of the aperture 109b, a diffuser to diffuse the second light emitted from the backlight unit 111, or may position the backlight unit 111 in the position of the aperture 109b instead of using the aperture 109b.

The 3D display apparatus 101 may further selectively include the diffuser between the image panel 107 and the optical sensor panel 109. However, it is only an example and thus, the 3D display apparatus 101 may prevent the first light, sensed by the sensor unit 109a of the optical sensor panel 109, from being blocked by the diffuser by positioning the diffuser in the position of the aperture 109b of the optical sensor panel 109.

The 3D display apparatus 101 may enable the backlight 111 to directly emit the second light towards the image panel 107 by positioning the backlight unit 111 in a position of the aperture 109b of the optical sensor panel 109. Accordingly, the 3D display apparatus 101 may prevent the second light from being blocked by the optical sensor panel 109.

The backlight unit 111 may be disposed below the image panel 107 or the optical sensor panel 109. In the display mode, the backlight unit 111 may emit the second light towards the image panel 107 according to a control of the controller 113, and may clearly display the image on the image panel 107.

The controller 113 may control a power of the backlight unit 111 associated with the image panel 107, based on the mode determined by the mode decision unit 103. For example, when the display mode is set by the mode decision unit 103, the controller 113 may control the backlight unit 111 to be powered on. In the display mode, the backlight unit 111 may emit the second light towards the image panel 107 to display an image by the second light on the image panel 107.

When the photographing mode is set by the mode decision unit 103, the controller 113 may control the backlight unit 111 to be powered off.

Although the controller 113 is separate from the mode decision unit 103 in FIG. 1, it is only an example. The controller 113 may include the mode decision unit 103 to control a mode switch.

According to example embodiments, a 3D display apparatus may provide a 3D image by enabling a left image and a right image provided to an image panel to be separately recognized through a barrier pattern of a barrier panel. By sensing light having been reflected from an object and having passed through a photographing pattern of the barrier panel, the 3D display apparatus may readily photograph an image of the object.

When the 3D display apparatus is applied to a terminal supporting a 3D video call, the 3D display apparatus may alternately support a photographing mode and a display mode to position both a configuration of displaying an image and a configuration of photographing the image. Accordingly, a user may match the user's viewpoint with a viewpoint of a counter party while making the 3D video call.

Figure 2:
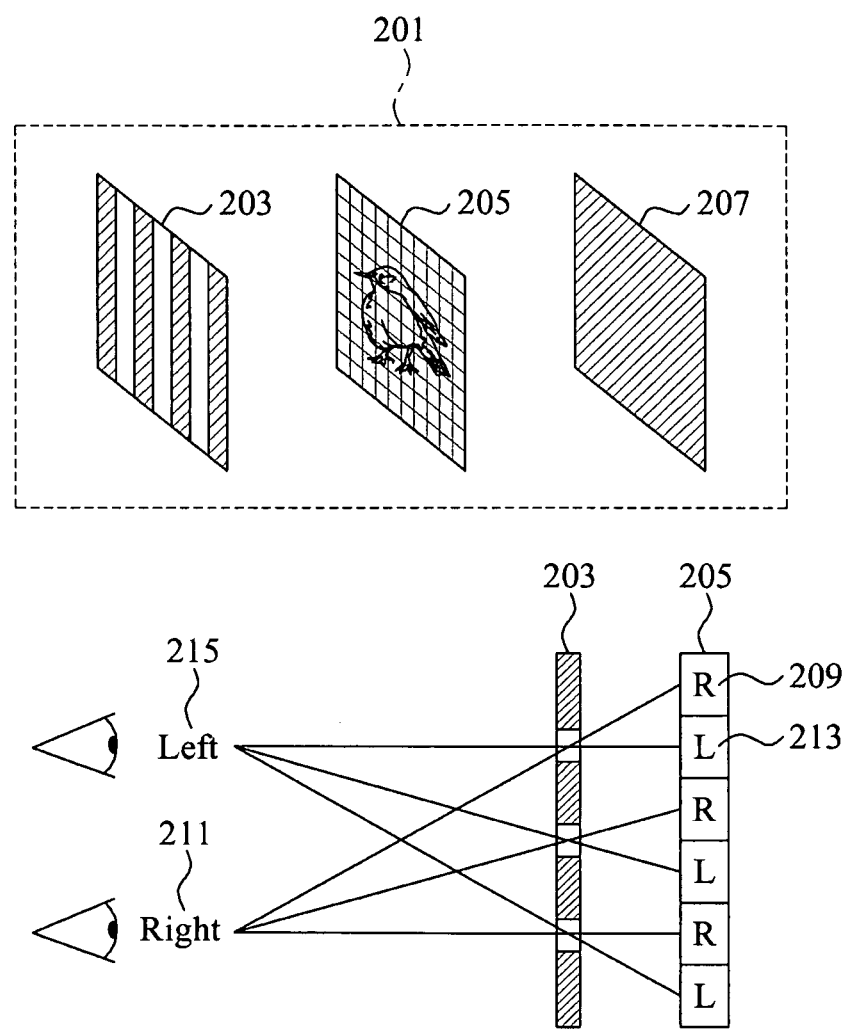
FIG. 2 illustrates a display mode of a 3D display apparatus according to example embodiments.

FIG. 2 illustrates a display mode of a 3D display apparatus 201 according to example embodiments.

Referring to FIG. 2, the 3D display apparatus 201 may include a barrier panel 203, an image panel 205, and a backlight unit 207. Here, it is assumed that the 3D display apparatus 201 is set to a display mode for concise description.

The barrier panel 203 may form a barrier pattern for three-dimensionally visualizing an image displayed on the image panel 205 to enable a different image to be recognized based on a parallax of a left eye and a right eye. The barrier panel 203 may form, for example, a stripe pattern as the barrier pattern.

Referring to FIG. 2, according to a stripe pattern, the barrier panel 203 enables a right eye 211 to recognize a right image 209 displayed on the image panel 205 and enables a left eye 215 to recognize a left image 213 displayed on the image panel 205. Accordingly, a user may readily receive a 3D image.

The image panel 205 may display a left image and a right image by controlling RGB sub-pixels within each pixel based on the 3D image to be displayed. The image panel 205 may alternately display the left image and the right image. For example, the image panel 205 may display the left image in a first pixel, and may display the right image in a second pixel adjacent to the first pixel. For example, the second pixel may be positioned in left, right, up, or down based on the first pixel.

The backlight unit 207 may control the image displayed on the image panel 205 to be clear by emitting a second light towards the image panel 205.

Even though the 3D display apparatus 201 may include an optical sensor panel in the image panel 205, an operation of the optical sensor panel may be constrained since optical sensing of the optical sensor panel is not used in the display mode.

Figure 3:
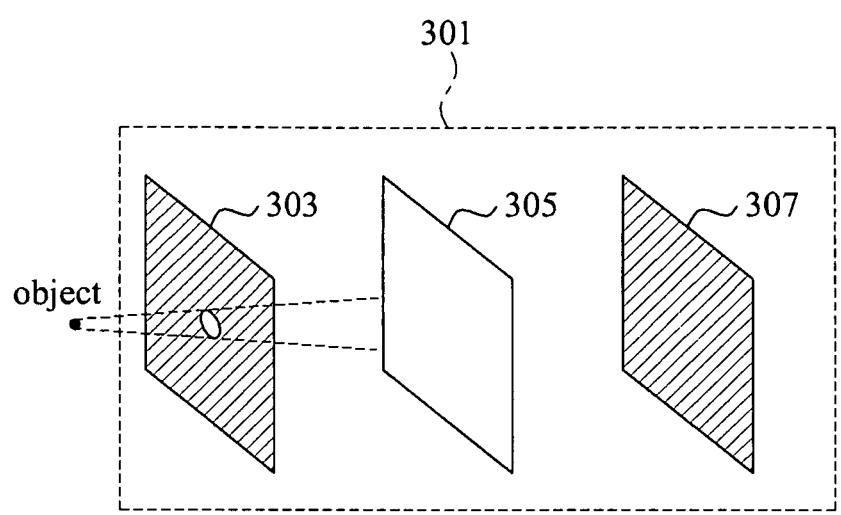
FIG. 3 illustrates a photographing mode of a 3D display apparatus according to example embodiments.

FIG. 3 illustrates a photographing mode of a 3D display apparatus 301 according to example embodiments.

Referring to FIG. 3, the 3D display apparatus 301 may include a barrier panel 303, an image panel 305, and a backlight unit 307. Here, it is assumed that the 3D display apparatus 301 is set to a photographing mode for concise description.

The barrier panel 303 may form a photographing pattern for passing a first light reflected from an object. The barrier panel 303 may include an opaque first pixel and a transparent second pixel, and may form a circular hole as the photographing pattern by combining the first pixel and the second pixel. In addition to the circular hole, the barrier panel 303 may form, as the photographing pattern, at least one pattern of a polygonal hole and a modified uniformly redundant array (MURA).

The barrier panel 303 may pass the first light reflected from the object through an optical meaning of a hole capable of passing the light instead of blocking the light.

The image panel 305 may be integrally configured with an optical sensor panel by including the optical sensor panel. The image panel 305 may include a sensor unit to sense the first light together with RGB sub-pixels within each pixel.

The image panel 305 may acquire image data by operating the internal sensor unit to sense the first light having passed through the barrier panel 303.

Since the image is not displayed on the image panel 305, a second light emitted from the backlight unit 307 towards the image panel 305 may not be used. Accordingly, the backlight unit 307 may be powered off by a controller.

Figure 4A:
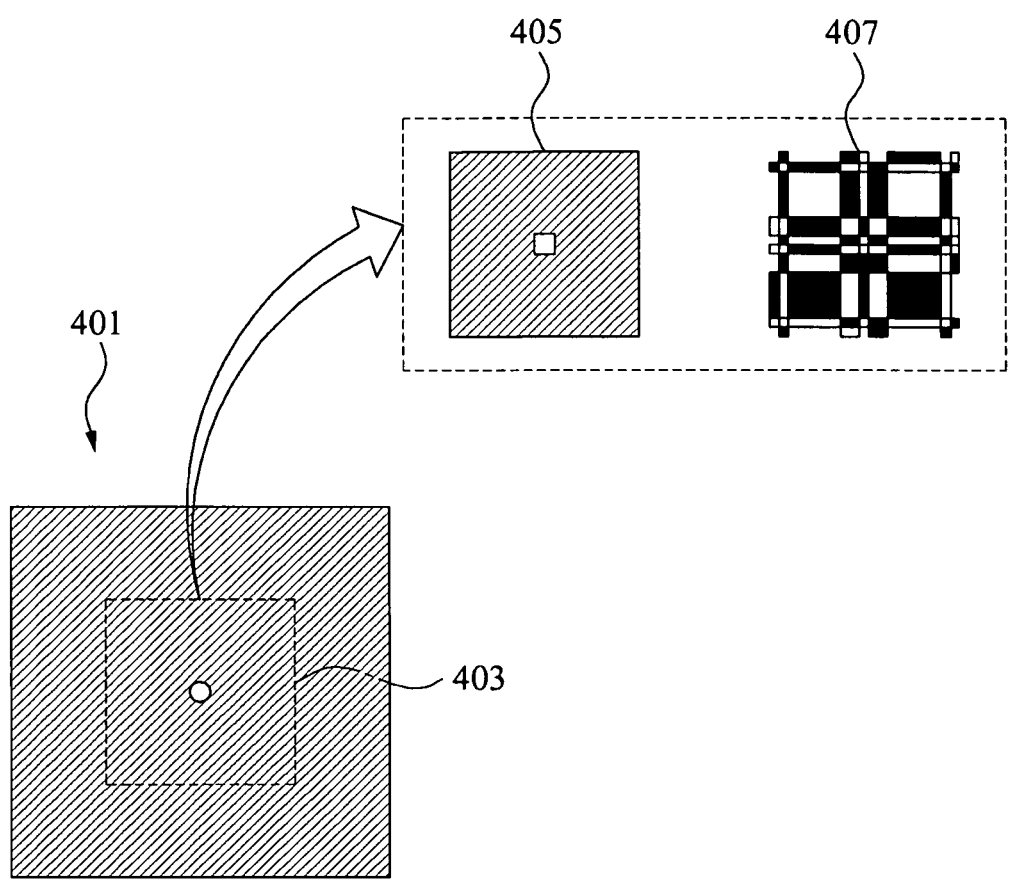
FIG. 4A through FIG. 4C illustrate a pattern of a barrier panel included in a 3D display apparatus according to example embodiments.
Figure 4B:
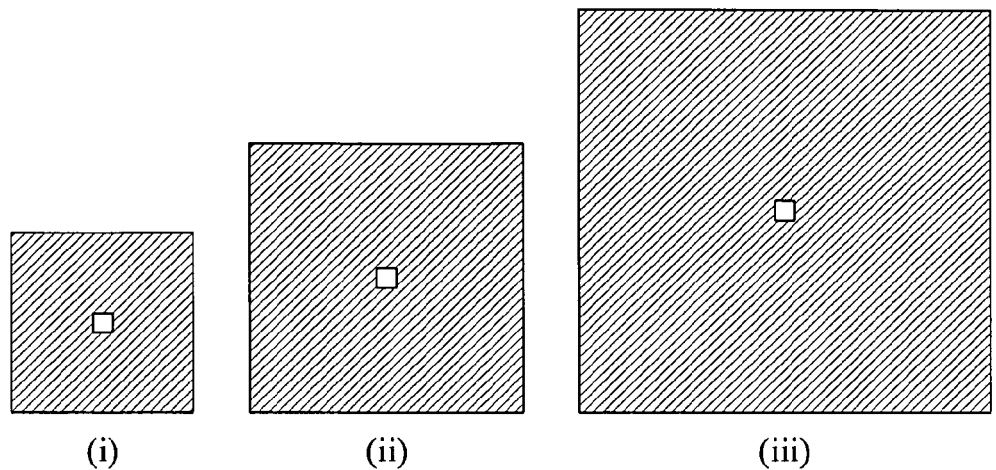
Figure 4C:
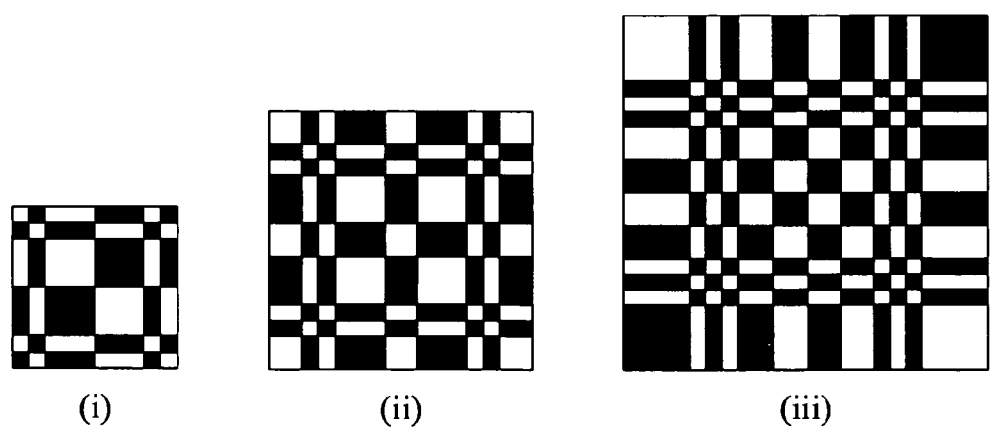

FIG. 4A through FIG. 4C illustrate a pattern formed in a barrier panel 401 included in a 3D display apparatus according to example embodiments.

Referring to FIG. 4A, the barrier panel 401 may form a pattern 403 by controlling a first pixel to be opaque and by controlling a second pixel, different from the first pixel, to be transparent, and may form a hole to be included in the pattern 403 so that a light reflected from an object may pass through the hole.

The barrier panel 401 may form the pattern 403 including a circular hole. However, it is only an example and thus, the barrier panel 401 may form a pattern 405 including a polygonal hole and a pattern 407 including a MURA.

As shown in FIG. 4B, the barrier panel 401 may form (i) a hole pattern of 11×11 unit, (ii) a hole pattern of 17×17 unit, or (iii) a hole pattern of 23×23 unit. As shown in FIG. 4C, the barrier panel 401 may form (i) a MURA pattern of 11×11, (ii) a MURA pattern of 17×17, or (iii) a MURA pattern of 23×23 unit.

FIG. 5 illustrates a pattern formed in a barrier panel included in a 3D display apparatus according to other example embodiments.

Referring to FIG. 5, the barrier panel may repeatedly form a plurality of patterns. For example, when the barrier panel desires to pass two first lights reflected from an object, the barrier panel may be formed to include two patterns. When the barrier panel desires to pass 12 first lights reflected from the object, the barrier panel may repeatedly form 12 patterns.

Accordingly, the 3D display apparatus may form the plurality of patterns on the barrier panel, and may acquire image data of the object by sensing a plurality of first light using an optical sensor panel. Accordingly, it is possible to obtain an effect of taking a photo using a plurality of cameras.

Figure 6:
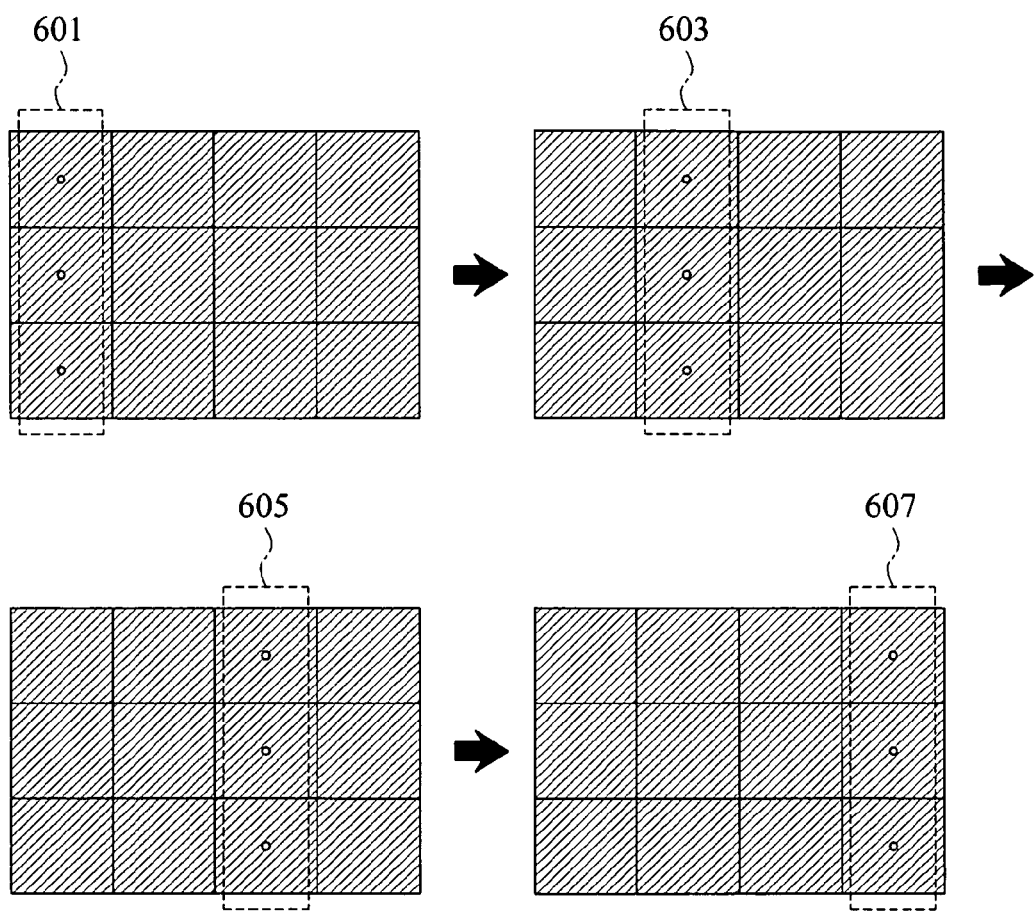
Figure 7:
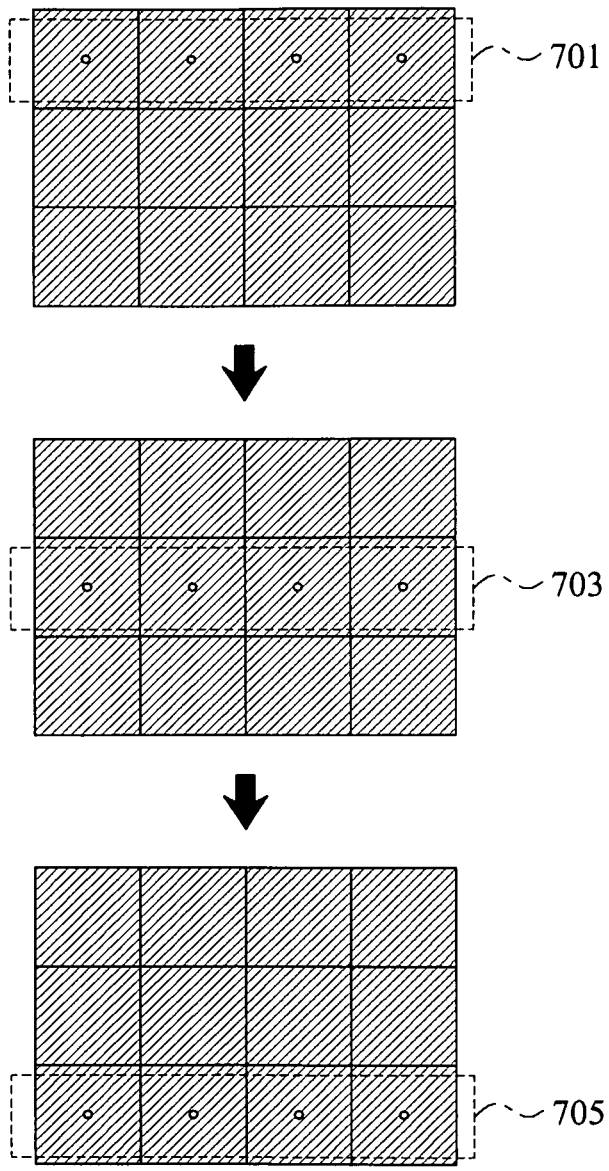

FIG. 6 through FIG. 8 illustrate a pattern formed in a barrier panel included in a 3D display apparatus according to still other example embodiments.

The barrier panel may form a plurality of patterns, and may also change a number of patterns or a position of each pattern by changing at least one of a number of opaque first pixels, a number of transparent second pixels, a position of each opaque first pixel, and a position of each transparent second pixel at predetermined intervals.

Referring to FIG. 6, the barrier panel may horizontally move the plurality of patterns by sequentially forming the plurality of patterns in a first column 601, a second column 603, a third column 605, and a fourth column 607 at predetermined intervals.

Referring to FIG. 7, the barrier panel may vertically move the plurality of patterns by sequentially forming the plurality of patterns in a first line 701, in a second line 703, and a third line 705 at predetermined intervals.

Referring to FIG. 8, the barrier panel may form the plurality of patterns and change a pattern position using an interleaving method.

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A three-dimensional (3D) display apparatus, comprising:
   a mode determiner, comprising a processor, to determine a mode, between a display mode and a photographing mode, corresponding to a predetermined criterion;
   a barrier panel to change a pattern based on the determined mode;
   an image panel to display an image; and
   a controller to control a power of a backlight unit associated with the image panel, based on the determined mode, and to control a pixel within the image panel to be transparent; and
   an optical sensor panel disposed in a rear end of the image panel to sense an object light having been reflected from an obiect and having passed through the barrier panel and the image panel when the photographing mode is set by the mode determiner,
   wherein when a photographing mode is set by the mode determiner, the barrier panel changes the barrier panel pattern to a photographing pattern for passing an object light from an object, the photographing pattern including at least one pattern of a circular hole, a polygonal hole, and a modified uniformly redundant array (MURA) obtained by combining an opaque pixel and a transparent pixel, and being a different pattern from the barrier panel pattern formed in the display mode.

2. The apparatus of claim 1, wherein:
   when the display mode is set by the mode determiner, the barrier panel forms a barrier pattern for three-dimensionally visualizing the image displayed on the image panel, and the controller controls the backlight unit to be powered on.

3. The apparatus of claim 1, wherein the controller controls the backlight unit to be powered on when the display mode is set.

4. The apparatus of claim 3, wherein in the display mode, the backlight unit emits a backlight towards the image panel to display, on the image panel, an image by the backlight.

5. The apparatus of claim 1, wherein in the photographing mode, the controller controls the backlight unit to be powered off.

6. The apparatus of claim 1, wherein the optical sensor panel comprises:
   a sensor unit to sense the object light; and
   an aperture to pass a backlight from the backlight unit towards the image panel when a display mode is set by the mode determiner.

7. The apparatus of claim 6, wherein:
   the optical sensor panel further comprises a diffuser to diffuse the backlight in a position of the aperture, or
   the optical sensor panel positions the backlight unit in the position of the aperture instead of using the aperture.

8. The apparatus of claim 6, wherein the optical sensor panel configures the sensor unit and the aperture in a form of a grid pattern, or in a form of a repeating pattern.

9. The apparatus of claim 1, wherein:
   the optical sensor panel comprises a first sensor unit and a second sensor unit to sense the object light,
   each of the first sensor unit and the second sensor unit comprises a unit color filter having a different color, or
   each of the first sensor unit and the second sensor unit comprises a plurality of color filters having different colors.

10. The apparatus of claim 1, wherein the optical sensor panel is included in the image panel.

11. The apparatus of claim 1, wherein:
    the barrier panel comprises an opaque first pixel and a transparent second pixel, and
    the at least one pattern of a circular hole, a polygonal hole, and a modified uniformly redundant array (MURA) is formed by combining the first pixel and the second pixel.

12. The apparatus of claim 1, wherein the barrier panel further comprises a contact sensor panel to enable a touch sensing with an object.

13. The apparatus of claim 1, wherein the mode determiner sets, as the criterion, a mode switch command.

14. The apparatus of claim 13, wherein the mode switch command is a frequency of 120Hz.

15. A method for controlling a three-dimensional (3D) display apparatus, the method comprising:
    switching a mode of the 3D display apparatus between a photograph mode and a display mode;
    displaying an image based on the switched mode by an image panel;
    controlling a pixel within the image panel to be transparent; and
    sensing, in a rear end of the image panel, an obiect light having been reflected from an obiect and having passed through a barrier panel and the image panel; and
    changing a pattern of the barrier panel when the mode is switched between the photograph mode and the display mode,
    wherein the changing comprises:
    when the mode is switched to the photograph mode, the barrier panel forms a photographing pattern for passing the object light from an object, the photographing pattern including at least one pattern of a circular hole, a polygonal hole, and a modified uniformly redundant array (MURA) obtained by combining an opaque pixel and a transparent pixel, and being a different pattern from the barrier panel pattern formed in the display mode.

16. The method of claim 15, wherein the switching mode is switched by any of a mode switch command, and mode switch period.

17. The method of claim 15, the method further comprising:
selectively operating a backlight.

18. The method of claim 15, the method further comprising:
selectively operating an optical sensing panel based on the switched mode.

19. The method of claim 18, wherein the switching comprises:
for a predetermined operating frequency of the 3D display apparatus, controlling the 3D display apparatus to operate in the photograph mode for a portion of the predetermined operating frequency and controlling the 3D display apparatus to operate in the display mode for a remaining portion of the predetermined operating frequency.

* * * * *